United States Patent
Lee et al.

(10) Patent No.: US 6,614,483 B1
(45) Date of Patent: Sep. 2, 2003

(54) APPARATUS AND METHOD FOR COMPRESSING IMAGE DATA RECEIVED FROM IMAGE SENSOR HAVING BAYER PATTERN

(75) Inventors: Suk J Lee, Ichon-shi (KR); Sang Y Kim, Ichon-shi (KR)

(73) Assignee: Hynix Semiconductor Inc., Kyungki-do (KR)

( * ) Notice: Subject to any disclaimer, the term of this patent is extended or adjusted under 35 U.S.C. 154(b) by 0 days.

(21) Appl. No.: 09/301,114

(22) Filed: Apr. 28, 1999

(30) Foreign Application Priority Data

Apr. 30, 1998 (KR) .............................. 98-15469

(51) Int. Cl.⁷ ................................ H04N 7/12
(52) U.S. Cl. ................................... 348/391.1
(58) Field of Search .............. 348/391, 222, 348/272, 277, 278; 382/166; 358/518

(56) References Cited

U.S. PATENT DOCUMENTS

| | | | | |
|---|---|---|---|---|
| 5,046,119 A | * | 9/1991 | Hoffert et al. | 382/56 |
| 5,065,229 A | * | 11/1991 | Tsai et al. | 358/21 |
| 5,493,335 A | * | 2/1996 | Parulski et al. | 348/233 |
| 5,889,554 A | | 3/1999 | Mutze | 348/273 |
| 6,130,960 A | * | 10/2000 | Acharya | 382/167 |
| 6,229,578 B1 | * | 5/2001 | Acharya et al. | 348/607 |

OTHER PUBLICATIONS

M.T. Orchard and C.A. Bouman, "Color Quantization of Images," *IEEE Transactions on Signal Processing*, part 39, No. 12, Dec. 1991, pp. 2677–2690, XP000275119, New York, N.Y.

A.K. Jain, "Image Data Compression: A Review," *Proceedings of the IEEE*, part. 69, No. 3, Mar. 1981.

Hon–Sum Philip Wong, "CMOS Image Sensors—Recent Advances and Device Scaling Considerations," *International Electron Devices Meeting, IEEE*, Dec. 7, 1997, New York, N.Y.

Woodward Yang, "Cir cuit Integration Purches Image Sensor Performance," *Laser Focus World*, 1997, PennWell Publishing Co.

Keith Diefendorff, "CMOS Image Sensors Challenge CCDs," *Microprocessor Report*, vol. 12, No. 8, Jun. 22, 1998.

Preliminary HV7141A, "CMOS Image Senor With 8–bit ADC," product description sheet, Hyundai Electronics Industries Co., Ltd.,Ichon–Si, Kyoungki–Do, Korea.

* cited by examiner

*Primary Examiner*—Chris Kelley
*Assistant Examiner*—George A Bugg, Jr.
(74) *Attorney, Agent, or Firm*—Townsend and Townsend and Crew LLP

(57) ABSTRACT

Method and apparatus for image data compression that greatly reduces implementational complexity and cost, and improves error correction. These improvements are achieved at various implementational blocks which include a color extraction unit that can perform a first level of compression by reducing the frame size by, e.g., ¼ or ¹⁄₁₆. This is followed by compression through division by a programmable loss value where the division propagates the remainder to improve image quality. Differential coded modulation is then performed on the extracted color values to further reduce image data size. The result is variable length encoded using preferably a 1's complement approach that further reduces implementational complexity by eliminating VL coding tables. Finally, the VL encoded compressed data is packetized for transmission over a serial bus where the packetization improves error correction.

34 Claims, 9 Drawing Sheets

FIG. 3
(PRIOR ART)

```
R11  G12  R13  G14  R15  G16  R17  G18  ······  1st LINE
G21  B22  G23  B24  G25  B26  G27  B28  ······  2nd LINE
R31  G32  R33  G34  R35  G36  R37  G38  ······
G41  B42  G43  B44  G45  B46  G47  B48  ······
R51  G52  R53  G54  R55  G56  R57  G58  ······
G61  B62  G63  B64  G65  B66  G67  B68  ······
R71  G72  R73  G74  R75  G76  R77  G78  ······
G81  B82  G83  B84  G85  B86  G87  B88  ······
 :    :    :    :    :    :    :    :
```

|       | R11 | G12 | R13 | G14 | R15 | G16 | R17 | G18 | ······ |
|-------|-----|-----|-----|-----|-----|-----|-----|-----|--------|
| 50 —  | G21 | B22 | G23 | B24 | G25 | B26 | G27 | B28 | ······ |
|       | R31 | G32 | R33 | G34 | R35 | G36 | R37 | G38 | ······ |
|       | G41 | B42 | G43 | B44 | G45 | B46 | G47 | B48 | ······ |
|       | R51 | G52 | R53 | G54 | R55 | G56 | R57 | G58 | ······ |
| 50' — | G61 | B62 | G63 | B64 | G65 | B66 | G67 | B68 | ······ |
|       | R71 | G72 | R73 | G74 | R75 | G76 | R77 | G78 | ······ |
|       | G81 | B82 | G83 | B84 | G85 | B86 | G87 | B88 | ······ |

FIG. 7

| Difference Values | Size | Size Coding | Difference Coding |
|---|---|---|---|
| −255~−128, 128~255 | 8 | 11111110 | 00000000~01111111, 10000000~11111111 |
| −127~−64, 64~127 | 7 | 1111110 | 0000000~0111111, 1000000~1111111 |
| −63~−32, 32~63 | 6 | 111110 | 000000~011111, 100000~111111 |
| −31~−16, 16~31 | 5 | 11110 | 00000~01111, 10000~11111 |
| −15~−8, 8~15 | 4 | 1110 | 0000~0111, 1000~1111 |
| −7~−4, 4~7 | 3 | 110 | 000~011, 100~111 |
| −3~−2, 2~3 | 2 | 10 | 00~01, 10~11 |
| −1, 1 | 1 | 0 | 0, 1 |
| 0 | | | |

FIG. 9b (32,25,50) (35,23,52) (36,23,53) (33,27,59) (35,26,57) ... → 1st LINE
(37,29,49) (40,28,51) (36,30,54) (39,29,58) (36,27,57) ... → 2nd LINE

FIG. 9c

1st STEP;
(8,6,12)   (35,24,54) (36,23,53) (33,27,59) (35,26,57) ... → 1st LINE
(37,29,49) (40,28,51) (36,30,54) (39,29,58) (36,27,57) ... → 2nd LINE

2nd STEP;
(8,6,12)   (8,6,13)   (39,23,55) (33,27,59) (35,26,57) ... → 1st LINE
(37,29,49) (40,28,51) (36,30,54) (39,29,58) (36,27,57) ... → 2nd LINE

3rd STEP;
(8,6,12)   (8,6,13)   (9,7,13)   (36,29,62) (35,26,57) ... → 1st LINE
(37,29,49) (40,28,51) (36,30,54) (39,29,58) (36,27,57) ... → 2nd LINE

FIG. 9d (8,6,12) (8,6,13) (9,7,13) (9,7,15) (8,7,14) ... → 1st LINE
(9,7,12) (10,7,13) (9,8,13) (10,7,15) (9,7,14) ... → 2nd LINE

FIG. 9e (8,6,12) (0,0,1) (1,1,0) (0,0,2) (−1,0,−1) ... → 1st LINE
(9,7,12) (1,0,1) (−1,1,0) (1,−1,2) (1,0,−1) ... → 2nd LINE

FIG. 9f (111101000,1110110,111101100) (0,0,101)   (101,101,0) (0,0,11010)   (100,0,100) ... → 1st LINE
(111101001,1110111,111101100) (101,0,101) (100,101,0) (101,100,11010) (101,0,100) ... → 2nd LINE

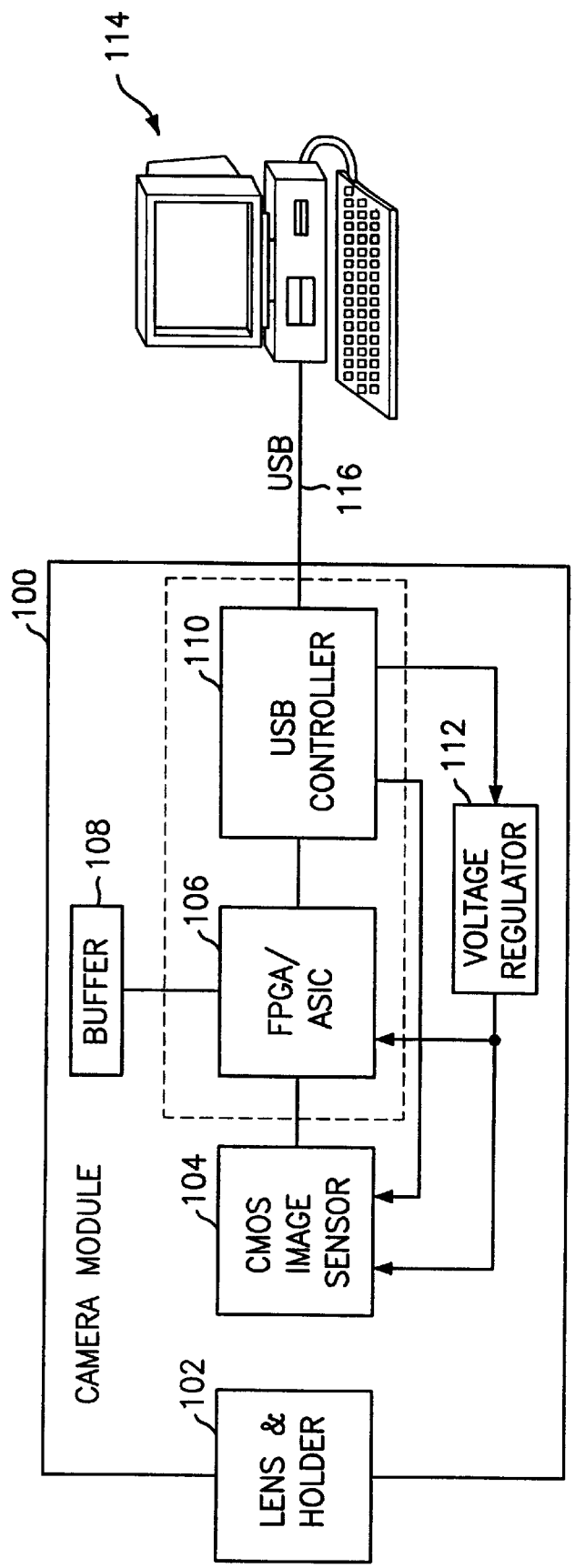

APPARATUS AND METHOD FOR COMPRESSING IMAGE DATA RECEIVED FROM IMAGE SENSOR HAVING BAYER PATTERN

BACKGROUND OF THE INVENTION

The present invention relates in general to image data processing, and in particular to a more efficient and cost-effective method and apparatus for compressing data received from an image sensor.

Digital image data compression techniques have been developed to dramatically improve the efficiency in image data storage and processing. Taking advantage of redundancies inherent in natural imagery, image data encoding and compression allow for faster transmission of images, lower power consumption, and more compact image storage. Various compression algorithms have been defined by industry standards groups such as the Joint Photographic Experts Group (JPEG) that has defined the compression standard for still picture data, and the Moving Picture Experts Group (MPEG) that has defined the compression algorithm for video, audio, and system bit stream.

The JPEG and MPEG video compression algorithms are based on discrete cosine transform (DCT) and inter-frame motion compensation (see, ISO/IEC JTC1/SC29/WG11, Information Technology—Coding of Moving Pictures and Associated Audio for Digital Storage Media). FIG. 1 is a block diagram illustrating data compression in the conventional DCT-based mode. As shown in FIG. 1, a forward DCT (FDCT) block 10 receives image data from an image sensor 20 and performs the DCT operation for removing redundancy data from the image data. A quantizer 12 independently performs quantization by classifying the DCT coefficient values from the FDCT 10 into a DC component and an AC component based on a quantization table. An entropy encoder 14 compresses the data by arranging the AC coefficients in a row through a differential DC coefficient coding and a zig-zag scan.

Implementation of this type of DCT-based data compression algorithm requires a large number of multipliers and adders, and usually imposes a relatively heavy burden on the hardware. Similarly heavy burdens are placed on the recovery side of the system where data is decompressed by a process that performs essentially the reverse of the above. This hardware intensive approach results in large and complex circuitry and increase manufacturing costs.

SUMMARY OF THE INVENTION

The present invention provides method and apparatus for compressing image data that are efficient and more cost effective to implement. The data compression technique of the present invention is particularly suitable for use with image sensors that use Bayer pattern for the pixel array. Broadly, the data compression technique according to the present invention first extracts the R/G/B values from the sensed image data. It then divides the extracted values by a programmable loss factor and obtains a difference value between the current and previous R/G/B values (e.g., performs differential pulse coded modulation—DPCM). The output is then variable length encoded and packetized for transmission as compressed image.

The resulting compression ratio according to this technique is lower than the DCT-based compression techniques, but it drastically reduces hardware complexity (i.e., gate count) and enables more efficient systems implementations (e.g., integration on a USB controller chip). The image data compression technique of the present invention therefore provides a much more desirable alternative for those applications that do not require maximum compression ratios.

Accordingly, in one embodiment, the present invention provides an image compression apparatus for compressing image data received from an image sensor, the system including a color extraction unit coupled to receive input image data from the image sensor, the color extraction unit being configured to extract red, green and blue color values; a compression unit coupled to the color extraction unit configured to divide down the color values by a selected factor; a variable length encoder coupled to the compression unit and configured to perform variable length encoding on the output of compression unit; and a data packet unit coupled to the variable length encoder configured to packetize compressed data for transmission.

In another embodiment, the present invention provides a method for compressing image data received from an image sensor, the method including the steps of extracting red, green and blue color values from the image data; dividing color values by a selected loss factor; obtaining difference values between current color values and previous color values; and encoding each difference value into a specific color value in response to a size of the difference value.

A better understanding of the nature and advantages of the image compression method and apparatus according to the present invention may be gained with reference to the detailed description and the accompanying drawings below.

BRIEF DESCRIPTION OF THE DRAWINGS

FIG. 3 is schematic diagram illustrating a Bayer pattern pixel array;

FIG. 4 is a schematic diagram illustrating ¼ frame R/G/B extraction of a Bayer pattern pixel array according to the present invention;

FIG. 5 is a schematic diagram illustrating 1/16 frame R/G/B extraction of a Bayer pattern pixel array according to the present invention;

FIG. 7 illustrates an exemplary variable length employed by one embodiment of the present invention;

FIGS. 9a to 9f are exemplary compression tables illustrating the data compression according to the present invention; and FIG. 10 shows an exemplary system using the image compression technique of the present invention.

DESCRIPTION OF THE SPECIFIC EMBODIMENTS

Figure 1:
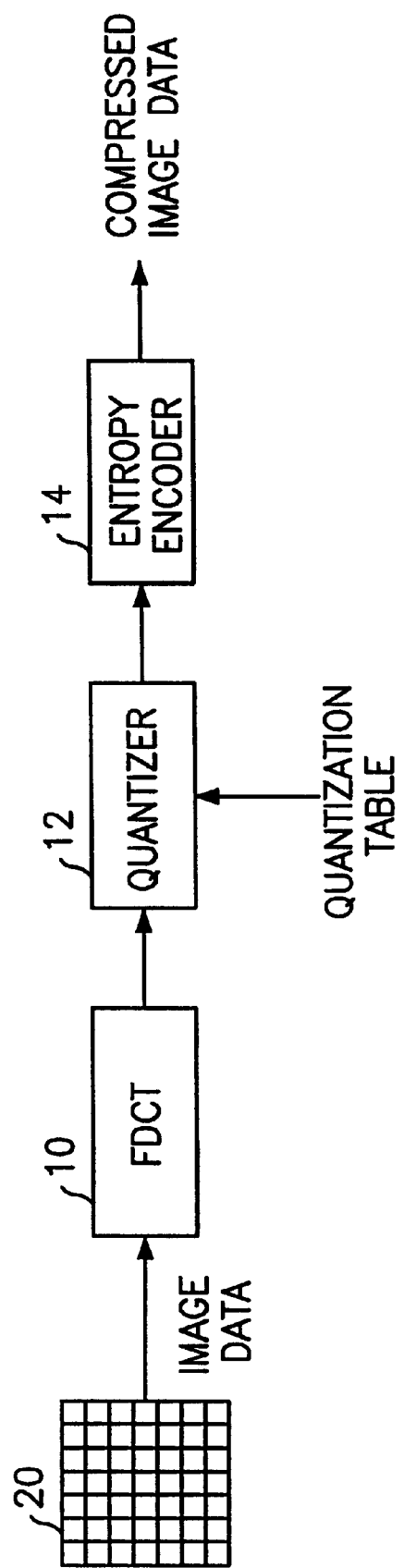
FIG. 1 is a block diagram illustrating data compression using conventional DCT-based algorithm.
Figure 2:
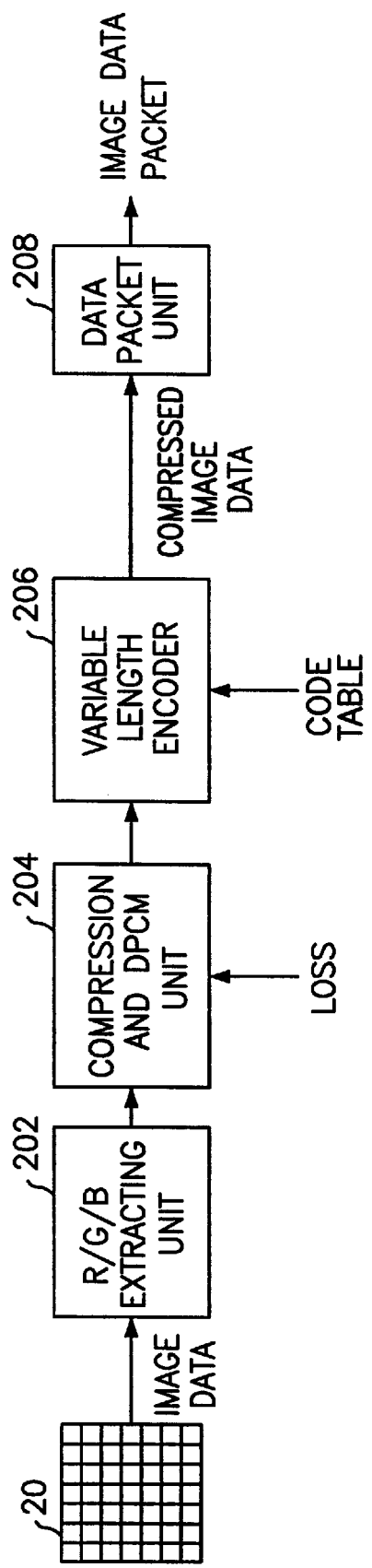
FIG. 2 is a circuit diagram illustrating an apparatus for compressing data according to the present invention.

Referring to FIG. 2, a data compression apparatus 200 according to the present invention is shown. Apparatus 200 includes an R/G/B color extraction unit 202 that connects to an image sensor and receives input image data at its input. The output of color extraction unit 202 connects to a compression and differential pulse coded modulation (DPCM) unit 204. Compression unit 204 receives a control signal indicating a selected loss value from an external controller (not shown) and supplies its output to a variable length encoder 206. The output of variable length encoder 206 connects to a data packetizer 208 that packetizes the compressed data for transmission.

An operational overview of data compression system 200 will be described hereinafter. R/G/B color extraction unit 202 receives input image data from the image sensor and extracts R (red), G (green) and B (blue) values for each pixel. Compression and DPCM unit 204 receives the R/G/B values from the R/G/B extraction unit 202 and performs a first level of compression by dividing the values by a selected loss value supplied by an external controller. The division performed by compression unit 204 uses a "remainder propagation" technique according to the present invention. The DPCM within unit 204 operates to obtain the difference value between current and previous R/G/B compressed values. Variable length (VL) encoder 206 performs a statistical compression of the difference data. In a preferred embodiment according to the present invention, a novel combination of 1's complement VL encoding with leading "zero" and "one" detection further simplifies the required hardware. This combination eliminates the VL encoding tables that are required when 2's complement VL encoding is used. Data packetizer 208 packetizes the output data from VL encoder 206 for transfer over a serial bus. A novel packet is defined by the present invention that includes a header to allow accurate packeting of data around pixel boundaries.

R/G/B color extraction unit 202 extracts the R/G/B values to transfer the image data from the image sensor to a color display. The extracting method varies depending on the pixel array pattern of the image sensor. FIG. 3 is a schematic diagram illustrating a common pixel array pattern referred to as Bayer pattern. According to the Bayer pattern, the pixel array is implemented by the repetition of a first line of RGRG color filters and a second line of GBGB color filters. The image sensor with a Bayer pattern pixel array senses specific colors corresponding to color filters covering the pixel, instead of obtaining all information about the R/G/B values of each pixel. Therefore, the final and complete color values must be obtained by these specific color data. A number of different color extraction methods may be used according to the present invention. Depending on the image color quality needed by the application, the present invention may employ one of three different color extraction modes: full frame; ¼ frame and ¹⁄₁₆ frame.

In the full frame color extraction method, one specific color value is extracted from a specific pixel and the other color values for that pixel are extracted from other pixels adjacent to the specific pixel. For example, referring to FIG. 3, the red value (R) at pixel R33 is extracted from pixel R33 while the green value (G) for pixel R33 is extracted from an average value of the green values (G) at four pixels G23, G32, G34 and G43. Likewise, the blue value (B) at pixel R33 is extracted from an average value of the blue values at four pixels B22, B24, B42 and B44. Similarly, the green value (G) at pixel G34 is extracted from pixel G34, while its red value (R) is extracted from an average value of the red values (R) at two pixels R33 and R35. The blue value (B) at Pixel B44 is extracted from pixel B44, while the red value (R) at pixel B44 is extracted from an average value of the red values (R) at four pixels R33, R35, R53 and R55. The green value (G) at pixel B44 is extracted from an average value of the green values (G) at four pixels G34, G43, G45 and G54.

R33=red value extracted from pixel R33
G33=(G23+G32+G34+G43)/4
B33=(B22+B24+B42+B44)/4
G34 green value extracted from pixel G34
R34=(R33+R35)/2
B34=(B24+B44)/2
B44=blue value extracted from pixel B44
R44=(R33+R35+R53+R55)/4
G44=(G34+G43+G45+54)/4

The second color extraction mode is the ¼ frame extraction which further reduces the amount of data. For further compression, instead of creating from the Bayer pattern an image which has the same size as the original array, the data compressing apparatus according to the present invention creates a compressed image, which is one-fourth as large as the original array size. Referring to FIG. 4, there is shown a pixel array for a ¼ frame compression mode. According to this mode of extraction, R/G/B color values are respectively obtained from a 2×2 unit pixel array (i.e., 4 pixels). That is, the R/G/B values are not extracted on a pixel by pixel basis, rather four pixel are taken as a unit and processed effectively as one pixel from which color values are derived. This has the effect of compressing the whole image data into a ¼ sized frame of data. An example will best illustrate this mode of color extraction. Referring to unit pixel array 40 which includes four pixels R11, G12, G21 and B22, the red value (R) for unit pixel 40 is obtained from the pixel R11, the green value (G) is extracted from an average value of the green values (G) from pixels G12 and G21, and the blue value (B) is extracted from pixel B22. In unit pixel array 40' consisting of the four pixels R31, G32, G41 and B42, the blue value (B2) is obtained from the pixel B42, the red value (R2) is obtained from pixel R31, and the green value (G2) is obtained from an average value of the green values (G2) at the pixels G32 and G41.

For unit pixel array 40:
R=R11
G=(G12+G21)/2
B=B22

For unit pixel array 40':
R=R31
G=(G32+G41)/2
B=B42

A third method of extraction that provides even further compression of data is the ¹⁄₁₆ frame color extraction shown in FIG. 5. According to this mode of color extraction, R/G/B color values are respectively obtained from a unit pixel array having 4×4 (=16) pixels for a ¹⁄₁₆ reduction in frame size. Color extraction is performed by averaging the various pixel colors. In unit pixel array 50, for example, the red value (R) is extracted from an average value of the red values at the pixels R11 and R33, the green value (G) is extracted from an average value of the green values at the pixels G12, G21, G34 and G43, and the blue value (B) is obtained from average value of the blue values at the pixels B22 and B44.

For unit pixel array 50:
R=(R11+R33)/2
G=(G12+G21+G34+G43)/4
B=(B22+B44)/2

Similarly, for unit pixel array 50':
R=(R51+R73)/2
G=(G52+G61+G74+G83)/4
B=(B62+B84)/2

For the ¼ frame and ¹⁄₁₆ frame extraction methods, it is also possible to extract color values for each unit array of pixels from a single pixel rather than averaging two. This compromises color accuracy and contrast and therefore the quality of the image, but further simplifies the necessary hardware required to implement the color extraction function.

Figure 6:
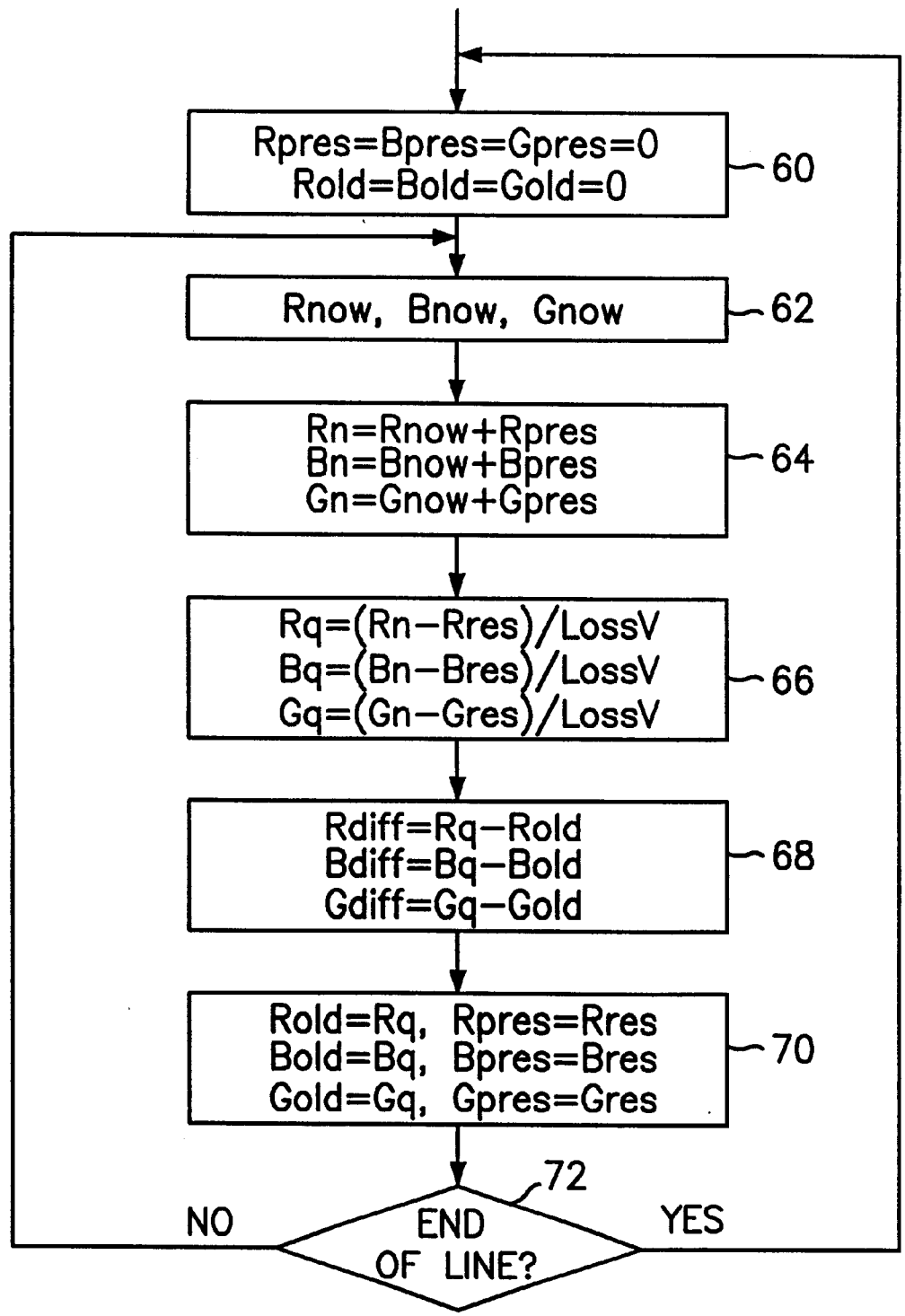
FIG. 6 is a flow chart illustrating division (compression) and difference operations according to the present invention.

Turning now to compression and DPCM unit 204, this block performs most of the compression of the size of each color value of the image data. FIG. 6 is a flow chart illustrating compression and difference operations according to the present invention. The first step in the process (step 60) is to initialize quotient color values Rold, Gold and Bold and remainder color values Rpres, Gpres and Bpres for a previous pixel, by setting them equal to "0". Compression and DPCM unit 204 then receives, at step 62, current color values Rnow, Gnow and Bnow from R/G/B extraction unit 202. At step 64, previous remainder color values Rpres, Gpres and Bpres are added to current color values Rnow, Gnow and Bnow, respectively, to arrive at total color values Rn, Gn and Bn. Step 64 thus performs the remainder propagation function required by the division as taught by the present invention. The remainder propagation aspect of the present invention provides dithering for smoother image transition, and therefore improves quality of the image over the prior art approaches that typically disregard the remainder color values.

Next, at step 66, new quotient color values Rq, Gq and Bq and new remainder color values Rres, Gres and Bres are obtained by dividing the total color values Rn, Gn and Bn by the loss value LossV. Loss value LossV is programmable (e.g., supplied by the controller) and sets the rate of image loss when the color values are recovered and displayed. LossV is programmed to a value based on the required quality of the image and the number of frames (e.g., the larger the number of frames the higher LossV).

At step 68, difference values Rdiff, Gdiff, and Bdiff are obtained by subtracting previous quotient color values Rold, Gold and Bold from current quotient color values Rq, Gq and Bq. Next, at step 70, previous quotient color values Rold, Gold and Bold, and previous remainder color values Rpres, Gres and Bpres are updated to their new values Rq, Gq and Bq and Rres, Gres and Bres, respectively. The above processing steps 62 through 70 are repeated until one line of the image sensor array is completed. After the completion of one line, a subsequent initialization is performed for a new line and the steps 60 through 70 are repeated for the new line. Color values are initialized at the beginning of each line since there is no relationship between a color value at the end of a line and a color value at the start of another line. An advantage of this method is that when an error is generated at the time of transferring compressed information to the next processing unit, its error range is limited to a fundamental unit of one line.

Further increase in compression ratio can be gained by a slight modification of the compression process described above. According to the above process, a large value for the first pixel results in a large compressed value because of the difference between the divided down first pixel value and a zero initial value. For example, when a value for the first pixel is 225, much larger than the zero initial value, and the initial value is set to "0", then 17 bits code word "11111111 011100001" occurs. Accordingly, the compression ratio is low.

For increase in compression ratio, in an alternate embodiment, the present invention sets the initial values Rold, Gold, and Bold to a non-zero value. The non-zero value would be decided based on the value of the first pixel. In an exemplary embodiment as described in the following Table 1, range of the value of the first pixel 0–255 is divided into eight sub-ranges, a different initial value (one of 0 through 7) is assigned to each of sub-range. That is, the initial values for Rold, Gold, and Bold can be set to one of eight possible values. By adding three bits that indicates which of the eight initial values are used, one can obtain better compression for the first pixel value.

TABLE 1

| the value of the first pixel | 0–31 | 32–63 | 64–95 | 96–127 | 128–159 | 160–191 | 192–223 | 224–255 |
|---|---|---|---|---|---|---|---|---|
| initial value | 0 | 1 | 2 | 3 | 4 | 5 | 6 | 7 |

In this embodiment, when the value of the first pixel is 225, an initial value is set as "7", that is "111", instead of "0", and 6 bits code word "111101" occurrs, thereby increasing the compression ratio.

The closer the value of the first pixel is to a multiple of 32, the smaller is the coded value.

The difference values Rdiff, Gdiff and Bdiff calculated at step 68 are then forwarded to the next block VL encoder 206. VL encoder 206 performs a statistical compression of the data whereby the smallest code word is assigned to the most frequently occurring values. With a large amount of repetition in color values among neighboring pixels, the most frequently occurring difference value would be "0" or near "0". Thus, the amount of data is significantly reduced by the present invention by carrying out the VL encoding on the difference values instead of encoding the actual color value. FIG. 7 is a table setting forth an exemplary VL encoding for difference values according to one embodiment of the present invention.

Another aspect of the present invention which further reduces hardware requirements and simplifies implementation of the data compression is the use of 1's complement (instead of 2's complement) in the VL encoding process. According to this method, the difference value is obtained by first adding one quotient value to the 1's complement of the other. Then, if the result is positive, all leading 0's are deleted to arrive at the difference value, and if the result is negative, all leading 1's are deleted to arrive at the difference value. VL encoding is then performed by combining the size value with the difference value separated by a deliminator bit (typically 0). Thus, the combination of 1's complement with leading 0 and 1 detector according to the present invention eliminates the need for a VL encoding table that would otherwise be required for the conventional coding approach using 2's complement.

Figure 8:
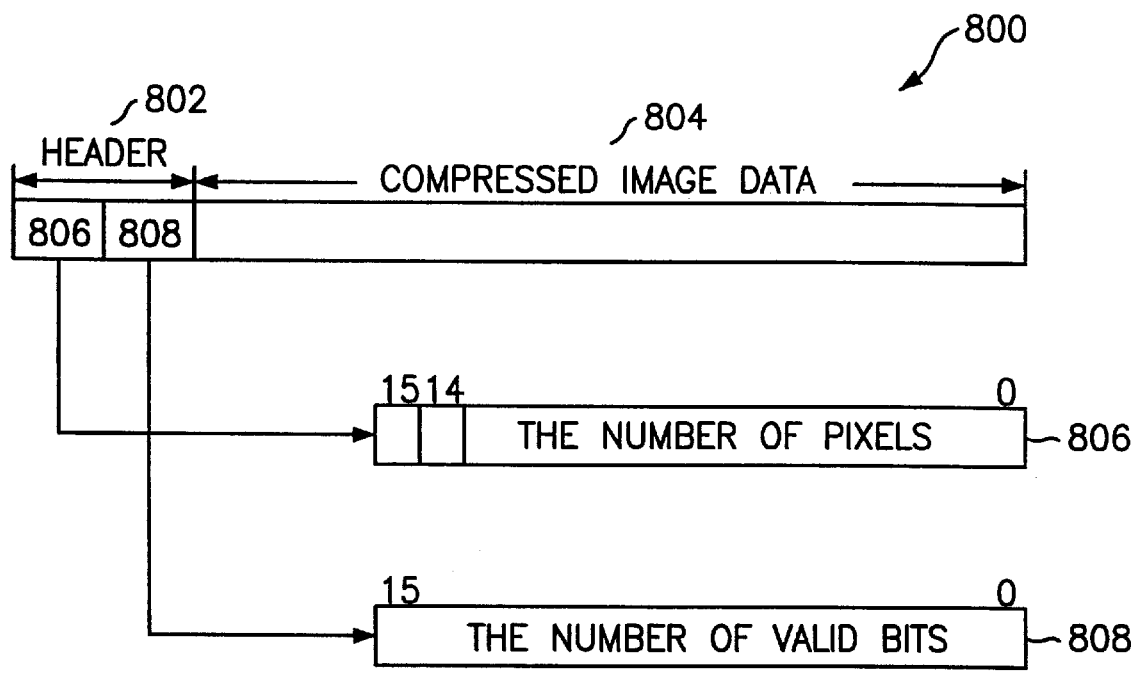
FIG. 8 is a schematic diagram illustrating an aspect of a data packet according to the present invention.

As the code length of the data encoded by VL encoder 206 varies, packetization of data is performed before transferring data over a serial bus, to enable the receiver to differentiate between the coded data in the received bit stream. FIG. 8 illustrates a preferred data packetization method as performed by data packetizer 208 of the present invention. Packet 800, according to the present invention, is divided into a header field 802 and a compressed image data field 804. Packet 800 may have an exemplary size of 512 bytes. Header field 802 is composed of a first field 806 of, e.g., 2 bytes, that contains information representing the number of pixels compressed within the 512 byte data field 804, and a second field 808 of, e.g., 2 bytes, that contains information representing the number of valid bits from the compressed image data. The most significant two bits of the first header field 806 indicate whether the packet is at the start of the frame ("10"), the end of a frame ("01"), or the middle of the frame ("00"). Since the present invention defines packets at pixel boundaries, image data field 804 may not be entirely filled with valid data, hence the need for header field 808 indicating the number of valid bits in the packet. The same may be true for a packet at the end of the bit stream (i.e., with less than 512 bytes left). This packetization according to the present invention thus provides a degree of error correction as the receiver is enabled to recover data even when an error is generated in the transmission lines.

For a better understanding of how the data compression technique of the present invention operates, FIGS. 9a to 9f are provided herein to illustrate compression of data for a specific Bayer pattern image example. FIG. 9a depicts a portion (10×4 lines) of an image data received from an image sensor having a Bayer pattern. Using a ¼ frame color extraction method, color extraction unit 202 arrives at R/G/B values for each 4×4 unit array. The R/G/B values for the first line and the second line of the array are shown in FIG. 9b where the three values in parentheses correspond to the three color values (R,G,B) for each 4×4 unit of pixel array. Thus, for the first array in the first line, the R value is 32, the G value is (24+26)/2=25, and the B value 50, and so on as described above. After the color extraction, division with remainder propagation is performed. In this example, a loss value LossV of 4 is assumed. Referring to FIG. 9c, there is shown the results of the remainder propagation division as steps 62 through 66 in the flow chart of FIG. 6 are repeated. With LossV=4, for the first R/G/B extracted values (32,25, 50) of the first line, the first R/G/B quotient color values (Rq, Gq, Bq) equal (8,6,12). The remainder color values (Rres=0, Gres=1, Bres=2) are propagated and added to the second R/G/B extracted color values (35,23,52) to arrive at the second R/G/B color values (Rn=35, Gn=23+1=24, Bn=52+ 2=54). This process is repeated for the second R/G/B quotient color values (Rq, Gq, Bq)=(8, 6, 13), with remainder propagation resulting in the third R/G/B color values (Rn, Gn, Bn) equaling (39, 23, 55). The third R/G/B quotient color values (Rq, Gq, Bq) become (9,7,13), resulting in the fourth R/G/B color values (Rn, Gn, Bn) equaling (36, 29, 62). This process continues until all of the color values are processed.

FIG. 9d illustrates the quotient color values (Rq, Gq, Bq) for each extracted color value for the 4×10 array shown in FIG. 9a. Note, however, that as shown in the flowchart of FIG. 6, in the preferred embodiment, the differentiating function performed by DPCM occurs in parallel with the division function. That is, as R/G/B color quotient values for each unit pixel array is developed, DPCM is performed with the previous color values before division for the next R/G/B color value is performed. Thus, the array shown in FIG. 9d is not actually arrived at any given time, and is provided here more for a full illustration of the division process. Instead, it is the array shown in FIG. 9e that represents the actual output of compression and DPCM unit 204. Taking the second R/G/B color quotient values from the first line (8,6,13) and subtracting its preceding R/G/B color quotient value (8,6,12) from it yields the value (0,0,1). This is entered as the color value for the second pixel in the first line. The third would be (9,7,13)–(8,6,13)=(1,1,0), and so on.

Finally, FIG. 9f illustrates the VL coding for the array of differential values in FIG. 9e. Taking for example the red color value from the first R/G/B differential value of the first line 8: the difference value is VL coded by the binary code 1000, and the size by 11110, resulting in "111101000". Similarly, a "0" is VL coded by a "0", a "1" is VL coded by "101", a "2" is VL coded by "11010", and a "−1" is VL coded by "100".

Adding up the total number of bits for the two lines in FIG. 9f (51 bits for the first line and 57 bits for the second line) yields a total number of 108 bits to represent the image data shown in FIG. 9a. With the original exemplary image size given by 10×4×8 bits=320 bits, a ⅓ compression is thus achieved by the compression technique of the present invention. As the length of each line increases the compression ratio also increases to yield even greater compression ratios. This compression ratio is not as high as that made possible by DCT-based algorithms where compression ratios of 1/20 to 1/100 are possible. However, the compression technique according to the present invention drastically reduces hardware requirements for its implementation as it does not require any multipliers. For example, with current technologies, the various functional blocks of the compression technique of the present invention as shown in FIG. 2 can be implemented by approximately 5,000 gates, while a DCT-based data compression implementation would typically require some 50,000 to 70,000 gates.

Furthermore, decompression of DCT-based compressed images requires a complex cosine operation that is commonly performed by software. This places a heavier load on the CPU as compared to the more simplified decomprssion algorithm that would be required by the present invention. With a reduced CPU decompression load, the present invention allows simultaneous running of other programs by the CPU while displaying moving images. There are many image processing applications where data compression requirements are not as high, and therefore costly DCT-based compression is not needed. Certain types of image capturing devices, PC cameras, digital still cameras or camcorders are examples of such applications.

Referring to FIG. 10, there is shown a block diagram for an exemplary system application of the data compression apparatus of the present invention. An image capturing device such as a camera module 100 includes a lens and holder 102 through which the image is applied to an image sensor 104. Image sensor 104 may be of a CMOS type as opposed to the CCD type. Data compression according to the present invention is implemented by either an application specific integrated circuit (ASIC) or a field programmable gate array (FPGA) 106 that receives sensed image data from image sensor 104. A buffer of, e.g., dynamic random access memory (DRAM) type 108 connects to ASIC 106 and provides storage for the image data to facilitate the processing of the data. A controller 110, such as a USB (universal serial bus) controller, connects to ASIC 106 and image sensor 104, and facilitates interface with USB 116. Camera module 100 also includes a power supply voltage regulator 112 that is controlled by USB controller 110 and supplies power to ASIC 106 and image sensor 104. The USB may connect camera module 100 to a host PC 114 that includes USB device driver, decompression software among other resources. In a system such as the one shown in FIG. 10, the significant reduction in the size of the data compression hardware (ASIC 106) makes it possible to integrate the compression hardware on the same chip as the controller. This results in substantial cost savings.

In conclusion, the present invention provides method and apparatus for image data compression that greatly reduces implementational complexity and cost, and improves error correction. These improvements are achieved at various implementational blocks which include a color extraction unit that can perform a first level of compression by reducing the frame size by, e.g., ¼ or 1/16. This is followed by compression through division by a programmable loss value where the division propagates the remainder to improve image quality. Differential coded modulation is then performed on the extracted color values to further reduce image data size. The result is variable length encoded using a 1's complement approach that further reduces implementational complexity by eliminating VL coding tables. Finally, the VL encoded compressed data is packetized for transmission over a serial bus where the packetization improves error correction. While the preferred embodiments of the invention have been disclosed for illustrative purposes, those skilled in the art will appreciate that various modifications, additions and substitutions are possible, without departing from the scope and spirit of the invention as defined by the following claims.

What is claimed is:

1. An image compression apparatus for compressing image data received from an image sensor, the apparatus comprising:
    a color extraction unit coupled to receive input image data from the image sensor, the color extraction unit being configured to extract red, green and blue color values;
    a data compression unit coupled to the color extraction unit and configured to divide down the color values by a selected loss factor, wherein the data compression unit propagates a remainder as it divides down the color values by the selected factor;
    a variable length encoder coupled to the data compression unit and configured to perform variable length encoding on output of data compression unit; and
    a data packetizer coupled to the variable length encoder and configured to arrange a bit stream of compressed data into a plurality of packets for serial transmission.

2. The image compression apparatus of claim 1 wherein the data compression unit comprises a difference modulator configured to obtain a difference between two divided down color values.

3. The image compression apparatus of claim 2 wherein the color extraction unit extracts the color values on a pixel-by-pixel basis from an array of pixels in the image data.

4. The image compression apparatus of claim 2 wherein the color extraction unit groups multiple pixels in an array unit and extracts red, green and blue color values for each array unit from pixels within the array unit.

5. The image compression apparatus of claim 4 wherein each array unit consists of a 2×2 array of four pixels.

6. The image compression apparatus of claim 4 wherein each array unit consists of a 4×4 array of 16 pixels.

7. An image compression apparatus for compressing image data received from an image sensor, the apparatus comprising:
    a color extraction unit coupled to receive input image data from the image sensor, the color extraction unit being configured to group multiple pixels in an array unit and extract red, green and blue color values for each array unit from pixels within the array unit;
    a data compression unit coupled to the color extraction unit and configured to divide down the color values by a selected factor, wherein the data compression unit propagates a remainder as it divides down the color values by the selected factor;
    a variable length encoder coupled to the data compression unit and configured to perform variable length encoding on output of the data compression unit; and
    a data packetizer coupled to the variable length encoder and configured to arrange a bit stream of compressed data into a plurality of packets for serial transmission.

8. An image compression apparatus for compressing image data received from an image sensor, the apparatus comprising:
    a color extraction unit coupled to receive input image data from the image sensor, the color extraction unit being configured to extract red, green and blue color values;
    a data compression unit coupled to the color extraction unit and configured to divide down the color values by a selected factor, wherein the data compression unit comprises a difference modulator configured to obtain a difference between two divided down color values, wherein the difference between the two divided down color values is obtained by performing a 1's complement operation, and wherein the variable length encoder deletes the leading 0's when the difference is positive and deletes the leading 1's when the difference is negative;
    a variable length encoder coupled to the data compression unit and configured to perform variable length encoding on output of data compression unit; and
    a data packetizer coupled to the variable length encoder and configured to arrange a bit stream of compressed data into a plurality of packets for serial transmission.

9. The image compression apparatus of claim 1 wherein each of the plurality of packets comprises a header field and a data field.

10. The image compression apparatus of claim 9 wherein the header field in each packet comprises a first portion carrying information indicating a number of valid bits in the data field, and a second portion carrying information indicating a number of pixels in the data field.

11. A method for compressing image data received from an image sensor, the method comprising the steps of:
    extracting red, green and blue color values from the image data; dividing color values by a selected loss factor to arrive at quotient color values; propagating remainder color values; and encoding each difference value into an encoded color value in response to a size of the difference value.

12. The method of compressing image data as in claim 11 wherein before the step of encoding, the method further comprises a step of obtaining difference values between a current quotient color value and previous quotient color value.

13. The method of compressing image data as in claim 12 further comprising a step of arranging encoded color values in packets for serial transmission.

14. The method of compressing image data as in claim 11 wherein the image data comprises a Bayer pattern color array.

15. The method of compressing image data as in claim 14 wherein the step of extracting comprises the steps of: grouping a plurality of pixels into a unit pixel array; and assigning a single set of red, green and blue color values to each unit pixel array based on individual pixels inside the array.

16. The method of compressing image data as in claim 15 wherein the step of assigning comprises: when there is only one pixel of a given color, using the color value of that one pixel as the value for that color for the unit pixel array; and wherein there are multiple pixels of a given color value, averaging the color values of the multiple pixels to arrive at the value for that color for the unit pixel array.

17. The method of compressing image data as in claim 11 wherein the step of propagating comprises a step of adding the remainder color value from a first color value to a second color value before the second color value is divided by the selected loss value.

18. A method for compressing image data received from an image sensor, the method comprising the steps of:

extracting red, green and blue color values from the image data;

dividing color values by a selected loss factor to arrive at quotient color values;

obtaining difference values between a current quotient color value and previous quotient color value by forming a 1's complement of the current quotient value; and adding the 1's complement of the current quotient value to the previous quotient value; and encoding each difference value into an encoded color value in response to a size of the difference value.

19. The method of compressing image data as in claim 13 wherein the step of arranging encoded color values in packets comprises the steps of:

grouping a plurality of encoded color values into a serial bit stream of a give size inside a data field; and adding a header field in front of the serial bit stream defining a length of the size of the bit stream.

20. A method of compressing color values extracted from image data, comprising the steps of:

(a) initializing remainder color values and quotient color values for a previous pixel;

(b) adding remainder color values from the previous pixel to color values from a current pixel to arrive at new color values;

(c) dividing the new color values by a loss factor to arrive at new quotient color values and new remainder color values for the current pixel;

(d) subtracting the new quotient color values for the current pixel from quotient color values for the previous pixel;

(e) updating remainder color values and quotient color values for a previous pixel with the new quotient color values and new remainder color values; and (f) repeating steps (b) through (e) until the end of one line of pixels.

21. The method of claim 20, further comprising the step of repeating steps (a) through (f) for a next line of pixels.

22. The method of claim 20, wherein the step (a) initializing includes the step of initializing remainder color values and quotient color values for a previous pixel as "0" value.

23. The method of claim 20, wherein the step (a) initializing includes the steps of dividing range of expressible color values into a plurality of sub ranges; encoding each of the plurality of sub ranges to a pre selected value; and initializing, in response to color value of the first pixel in each line, quotient color values for the previous pixel as an encoded value.

24. The method of claim 20, wherein the step (a) initializing includes the steps of dividing range of expressible color values "0" to "255" into eight sub ranges; encoding each of the eight sub ranges to a pre selected value; and initializing, in response to color value of the first pixel in each line, quotient color values for the previous pixel as one of eight possible encoded value.

25. The method of claim 24, wherein the encoded value is expressed by three (3) bits.

26. An image processing system comprising: an image capturing device comprising: an image sensor, a data compression block coupled to receive image data from the image sensor, the data compression block being configured to divide down color values by a selected factor, wherein the data compression unit propagates a remainder as it divides down the color values by the selected factor, a data storage block coupled to the data compression block, and a controller coupled to the data compression block and the image sensor; and a host image processing device coupled to the image capturing device by a serial bus.

27. The image processing system of claim 26 wherein the image sensor comprises a CMOS image sensor.

28. The image processing system of claim 27 wherein the data compression block is implemented by a reprogrammable logic device such as a field programmable gate array.

29. The image processing system of claim 27 wherein the data compression block is implemented by an application specific integrated circuit.

30. The image processing system of claim 26 wherein the controller and the data compression block are implemented on the same integrated circuit chip.

31. The image processing system of claim 26 wherein the image capturing device is a camera module, the serial bus is a universal serial bus, and the host image processing device is a personal computer.

32. The image compression apparatus of claim 2 wherein the color values are extracted with a Bayer pattern color array by one of extraction modes containing a full frame mode, a ¼ frame mode and a 1/16 frame mode.

33. The image compression apparatus of claim 2 wherein each array unit consists of a 2×2 array of four pixels in the ¼ frame extraction mode.

34. The image compression apparatus of claim 2 wherein each array unit consists of a 4×4 array of 16 pixels in the 1/16 frame extraction mode.

\* \* \* \* \*